(12) United States Patent
Taherzadeh Boroujeni et al.

(10) Patent No.: US 12,368,555 B2
(45) Date of Patent: Jul. 22, 2025

(54) PHYSICAL UPLINK CONTROL CHANNEL WITH ADAPTIVE DEMODULATION REFERENCE SIGNAL DENSITY

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 798 days.

(21) Appl. No.: 17/450,981

(22) Filed: Oct. 14, 2021

(65) Prior Publication Data

US 2022/0123896 A1 Apr. 21, 2022

Related U.S. Application Data

(60) Provisional application No. 63/093,069, filed on Oct. 16, 2020.

(51) Int. Cl.
*H04L 5/00* (2006.01)
*H04W 72/21* (2023.01)
(Continued)

(52) U.S. Cl.
CPC .......... *H04L 5/0051* (2013.01); *H04L 5/0055* (2013.01); *H04L 5/0096* (2013.01);
(Continued)

(58) Field of Classification Search
None
See application file for complete search history.

(56) References Cited

U.S. PATENT DOCUMENTS

2010/0272048 A1\* 10/2010 Pan ................ H04L 1/1635
370/329
2015/0085715 A1\* 3/2015 Sun ................ H04W 88/08
370/280

(Continued)

OTHER PUBLICATIONS

3GPP TS 36.211: "3rd Generation Partnership Project, Technical Specification Group Radio Access Network, Evolved Universal Terrestrial Radio Access (E-UTRA), Physical channels and modulation(Release 16)", 3GPP TS 36.211, V16.3.0, Sep. 2020, 97 Pages, Sections 5.4 and 5.5.2.

(Continued)

*Primary Examiner* — Hassan A Phillips
*Assistant Examiner* — Gautam Sharma
(74) *Attorney, Agent, or Firm* — Procopio, Cory, Hargreaves & Savitch LLP

(57) ABSTRACT

A base station transmits to a user equipment (UE), an indication of an adjustment to at least one of a density or a location of one or more demodulation reference signals (DMRS) for at least one physical uplink control channel (PUCCH) format. The base station monitors for PUCCH based on the adjustment to the density or the location of the DMRS indicated to the UE. A UE receives, from the base station an indication of an adjustment to at least one of a density or a location of one or more DMRS for at least one PUCCH forma and transmits, to the base station, a PUCCH based on the indication of the adjustment to at least one of the density or the location of the one or more DMRS.

29 Claims, 9 Drawing Sheets

(51) Int. Cl.
*H04W 72/23* (2023.01)
*H04W 72/51* (2023.01)

(52) U.S. Cl.
CPC ........... *H04W 72/21* (2023.01); *H04W 72/23* (2023.01); *H04W 72/51* (2023.01)

(56) References Cited

U.S. PATENT DOCUMENTS

| | | | |
|---|---|---|---|
| 2017/0359826 A1* | 12/2017 | Islam | H04B 7/0617 |
| 2018/0035386 A1* | 2/2018 | Yamada | H04J 11/004 |
| 2018/0212718 A1* | 7/2018 | Takeda | H04L 1/0031 |
| 2018/0295637 A1* | 10/2018 | Manolakos | H04W 72/54 |
| 2019/0044679 A1* | 2/2019 | Manolakos | H04L 5/0051 |
| 2019/0045390 A1* | 2/2019 | Davydov | H04W 28/0273 |
| 2019/0124643 A1* | 4/2019 | Qin | H04L 5/0048 |
| 2019/0174545 A1* | 6/2019 | Li | H04W 52/143 |
| 2020/0092876 A1* | 3/2020 | Cho | H04W 72/21 |
| 2020/0127763 A1* | 4/2020 | Yasukawa | H04L 5/0053 |
| 2020/0322887 A1* | 10/2020 | Pao | H04L 5/0057 |
| 2021/0203462 A1* | 7/2021 | Xiang | H04L 5/0044 |
| 2022/0123853 A1* | 4/2022 | Chandran | H04L 5/0048 |
| 2023/0198705 A1* | 6/2023 | Almquist | H04L 5/0016 |
| | | | 370/330 |

OTHER PUBLICATIONS

3GPP TS 38.211: "3rd Generation Partnership Project, Technical Specification Group Radio Access Network, NR, Physical Channels and Modulation (Release 16)", 3GPP TS 38.211, V16.3.0, Sep. 2020, pp. 1-133, sections 6.3.2 and 6.4.1.1.1.

* cited by examiner

PHYSICAL UPLINK CONTROL CHANNEL WITH ADAPTIVE DEMODULATION REFERENCE SIGNAL DENSITY

CROSS REFERENCE TO RELATED APPLICATION(S)

This application claims the benefit of and priority to U.S. Provisional Application Ser. No. 63/093,069, entitled "Physical Uplink Control Channel With Adaptive Demodulation Reference Signal Density" and filed on Oct. 16, 2020, which is expressly incorporated by reference herein in its entirety.

TECHNICAL FIELD

The present disclosure relates generally to communication systems, and more particularly, to adjusting demodulation reference signal (DMRS) density or location in one or more physical uplink control channel (PUCCH) formats.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication may balance a tradeoff between resource usage and increasing payload size. Wireless communication with a shorter PUCCH format (e.g., PUCCH format 0 and format 2) may be more vulnerable than longer PUCCH formats (e.g. PUCCH format 1, format 3, or format 4) in terms of coverage, whereas longer PUCCH formats may result in an unused payload and less efficient use of wireless resources. For example, if a user equipment (UE) uses a longer PUCCH format, the UE may use the same beam for additional communication, even with changing channel conditions. However, the use of a shorter PUCCH formats limits the payload.

Aspects presented herein enable the adaptation of PUCCH communication within a slot (e.g., rather than for repetitions over multiple slots). The adaptation may allow for an increased payload over time with a more efficient use of wireless resource. For example, using shorter PUCCH formats may enable faster beam switching and a quicker response to changes in channel conditions.

In an aspect of the disclosure, a method, a computer-readable medium, and an apparatus for wireless communication at a base station (BS) apparatus are provided. The apparatus is configured to transmit, to a UE, an indication of an adjustment to at least one of a density or a location of one or more demodulation reference signals (DMRS) for at least one physical uplink control channel (PUCCH) format. The apparatus is configured to monitor for PUCCH based on the adjustment to the density or the location of the DMRS indicated to the UE.

In an aspect of the disclosure, a method, a computer-readable medium, an apparatus for wireless communication at a UE are provided. The apparatus is configured to receive, from a base station, an indication of an adjustment to at least one of a density or a location of one or more DMRS for at least one PUCCH format. The apparatus is configured to transmit, to the base station, a PUCCH based on the indication of the adjustment to at least one of the density or the location of the one or more DMRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
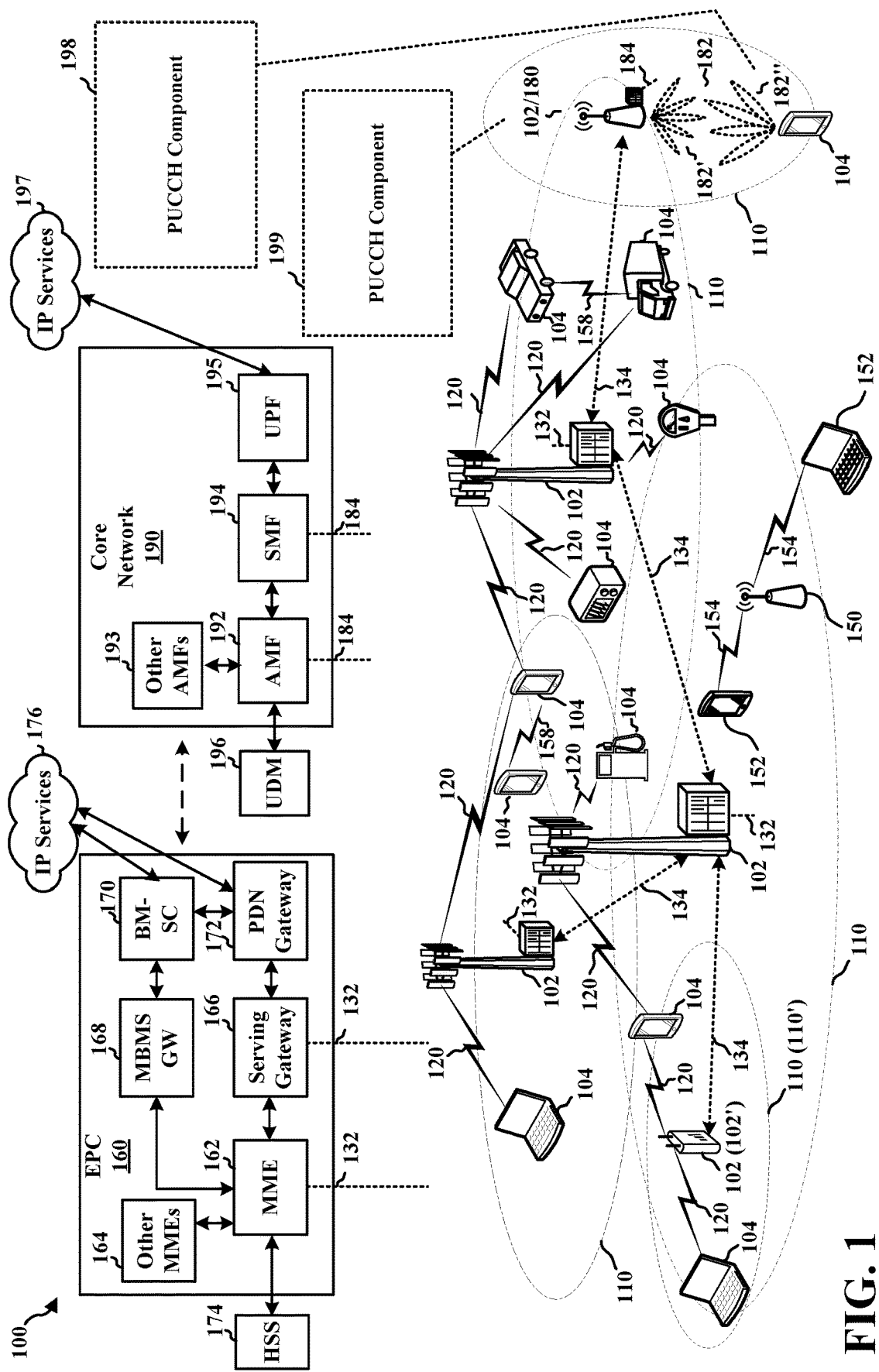
FIG. 1 is a diagram illustrating an example of a wireless communications system and an access network, in accordance with various aspects of the present disclosure.

Wireless communication may balance a tradeoff between resource usage and increasing payload size. Wireless communication with a shorter PUCCH format (e.g., PUCCH format 0 and format 2) may be more vulnerable than longer PUCCH formats (e.g. PUCCH format 1, format 3, or format 4) in terms of coverage, whereas longer PUCCH formats may result in an unused payload and less efficient use of wireless resources. For example, if a user equipment (UE) uses a longer PUCCH format, the UE may use the same beam for additional communication, even with changing channel conditions. However, the use of a shorter PUCCH formats limits the payload.

Aspects presented herein enable the adaptation of PUCCH communication within a slot (e.g., rather than for repetitions over multiple slots). The adaptation may allow for an increased payload over time with a more efficient use of wireless resource. For example, using shorter PUCCH formats may enable faster beam switching and a quicker response to changes in channel conditions.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured with a PUCCH component (198) that is configured to adjust the density or location of the DMRS for one or more PUCCH formats. In certain aspects, the base station 180 may be configured to with a PUCCH component (199) that is configured to determine to adjust the density or location of the DMRS for one or more PUCCH formats and send an indication to the UE to adjust the density or location of the DMRS for one or more PUCCH formats. Although the following description may be focused on 5G NR, the concepts described herein may be applicable to other similar areas, such as LTE, LTE-A, CDMA, GSM, and other wireless technologies.

Figure 2:
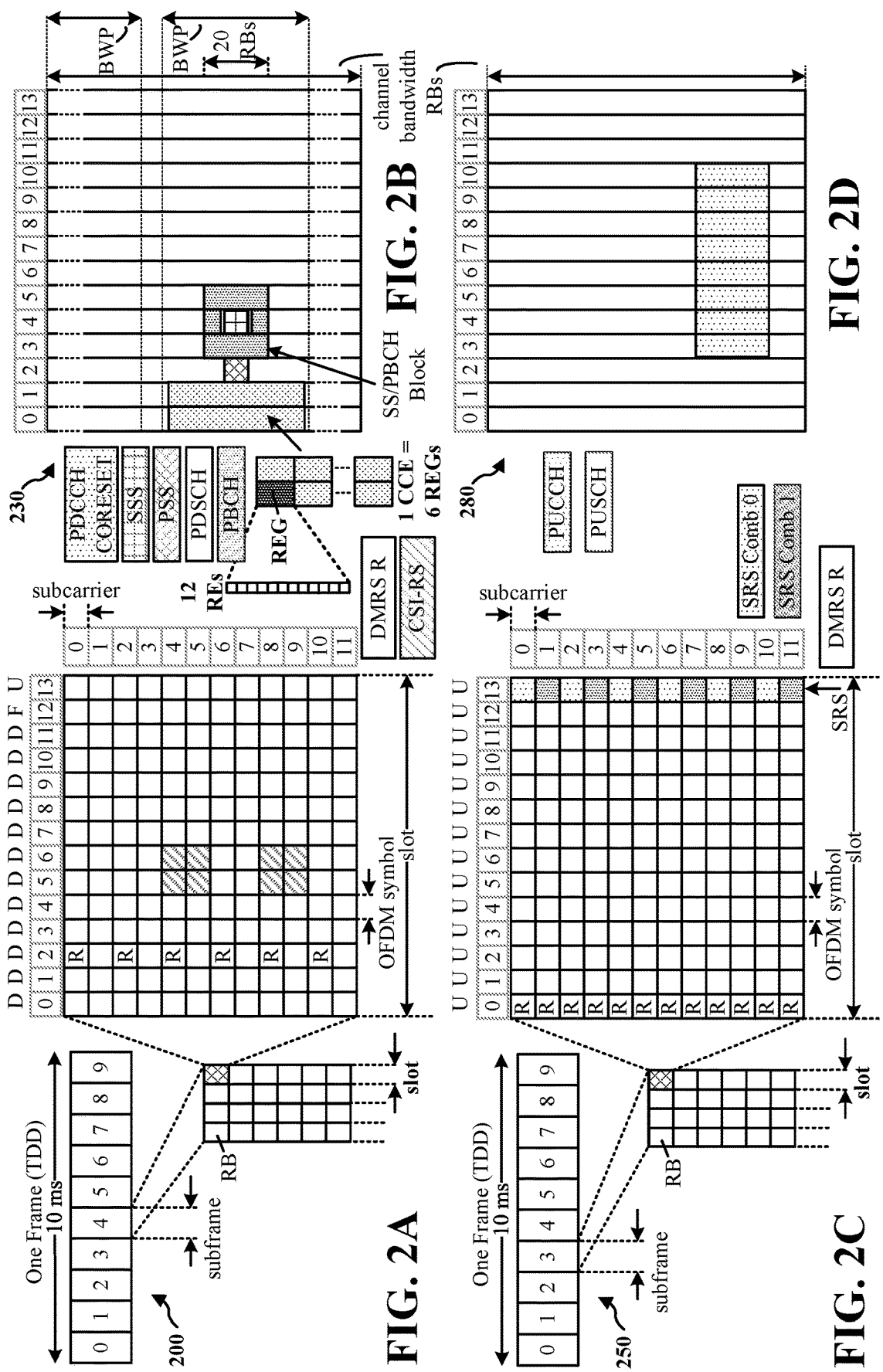
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
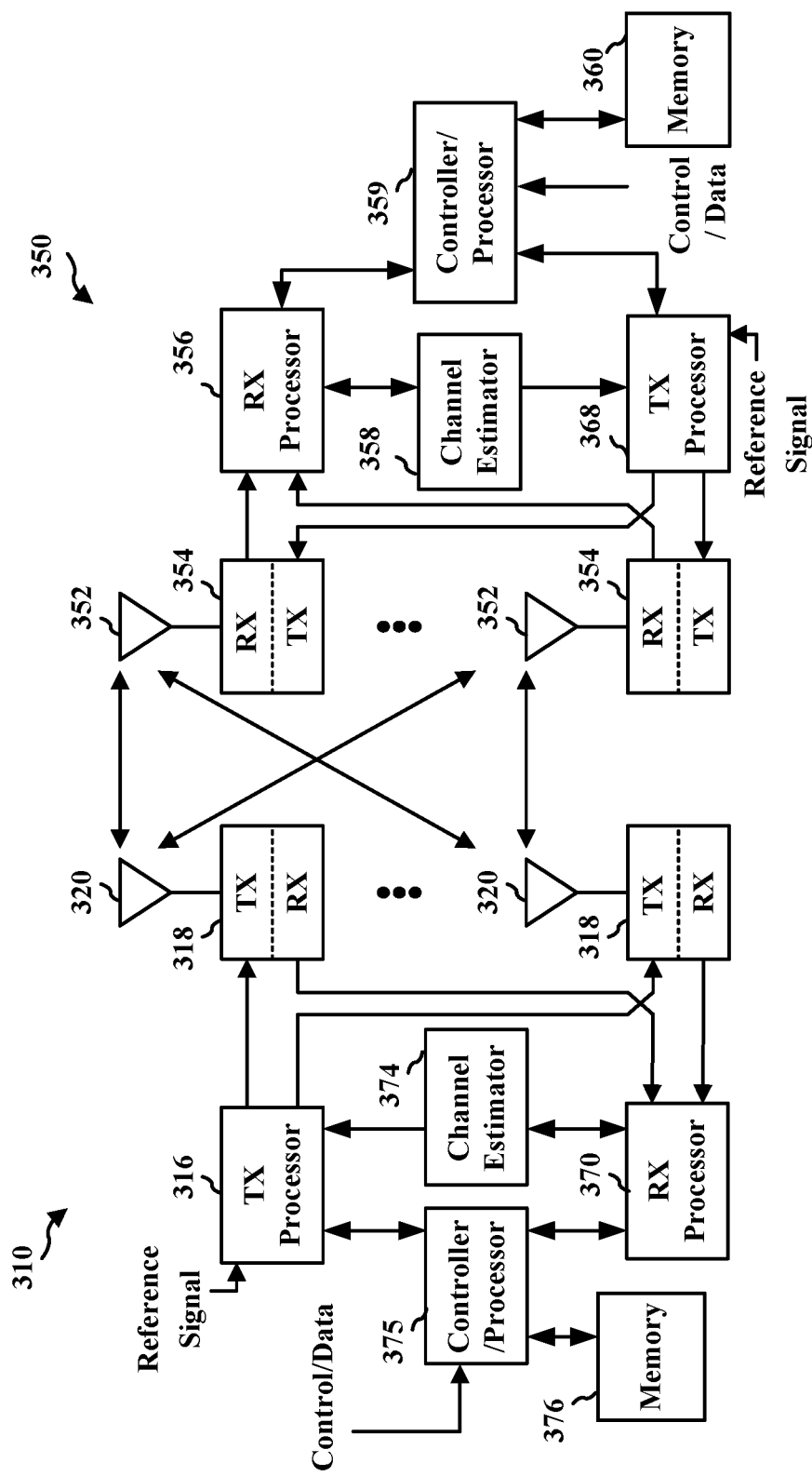
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto a radio frequency (RF) carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PUCCH component 198 of FIG. 1.

At least one of the TX processor 316, the RX processor 370, and the controller/processor 375 may be configured to perform aspects in connection with the PUCCH component 199 of FIG. 1.

Coverage enhancements for PUCCH may improve wireless communications, especially for larger payload sizes. In wireless communications, short PUCCH formats such as PUCCH format 0 and format 2 may be more vulnerable in terms of coverage. Yet, relying on longer PUCCH formats may lead to less efficient resource usage. Wireless communication with a shorter PUCCH format (e.g., PUCCH format 0 and format 2) may be more vulnerable than longer PUCCH formats (e.g. PUCCH format 1, format 3, or format 4) in terms of coverage, whereas longer PUCCH formats may result in an unused payload and less efficient use of wireless resources. For example, if a user equipment (UE) uses a longer PUCCH format, the UE may use the same beam for additional communication, even with changing channel conditions. However, the use of a shorter PUCCH formats limits the payload.

Table 1 illustrates an example of PUCCH formats and example lengths and numbers of bits. Table 1 is merely an example to illustrate an example comparison of different sizes of PUCCH formats. The aspects presented herein are not limited to application to the PUCCH formats described in Table 1.

TABLE 1

| PUCCH format | Length in #OFDM symbols | #UCI bits | Waveform | Description |
| --- | --- | --- | --- | --- |
| 0 | 1-2 | ≤2 | CGS seq | Short PUCCH format with 1-2 bits UCI |
| 1 | 4-14 | ≤2 | CGS seq | Long PUCCH format with 1-2 bits UCI (TD-OCC) |
| 2 | 1-2 | >2 | OFDM | Short PUCCH format with >2 bits UCI |
| 3 | 4-14 | >2 | DFT-S-OFDM | Long PUCCH format with >2-bits UCI and no multiplexing capability |
| 4 | 4-14 | >2 | DFT-S-OFDM | Long PUCCH format with >2-bits UCI and multiplexing capability |

Aspects presented herein enable the adaptation of PUCCH communication within a slot (e.g., rather than for repetitions over multiple slots). The adaptation may allow for an increased payload over time with a more efficient use of wireless resource. For example, using shorter PUCCH formats may enable faster beam switching and a quicker response to changes in channel conditions. This adjustment/adaptation of the PUCCH communication may improve use of wireless resources during a variety of different channel conditions. For example, using shorter PUCCH formats may allow for faster beam switching when a base station is serving multiple UEs.

Figure 4:
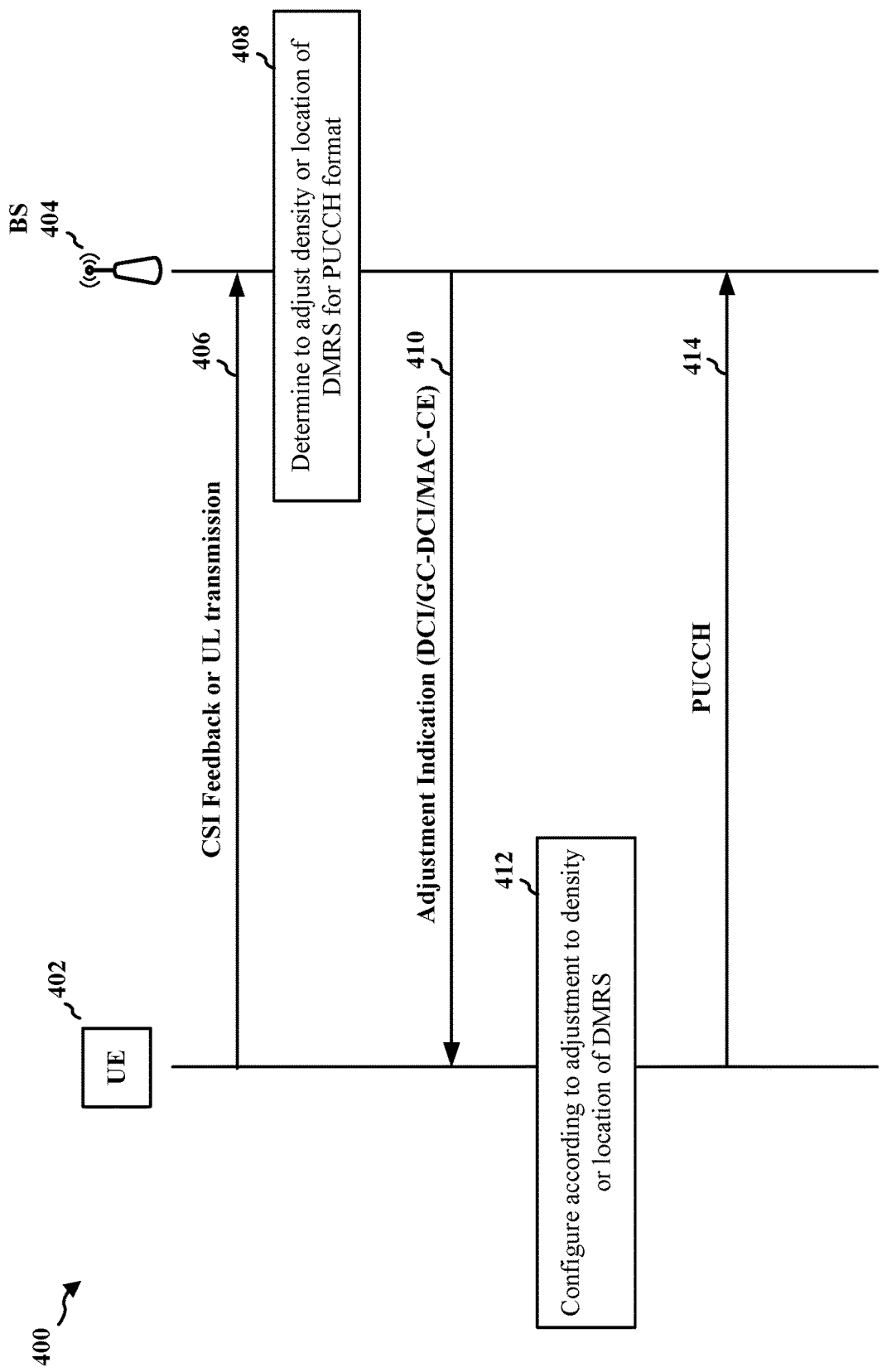
FIG. 4 is a diagram illustrating an example of communication between a UE and a BS to dynamically adjust PUCCH format communication, in accordance with various aspects of the present disclosure.

FIG. 4 is a diagram 400 illustrating an example of communication between a UE 402 and a base station 404 to dynamically adjust PUCCH format communication. Initially, at 406 the UE 402 transmits CSI feedback or an UL transmission to the base station 404. At 408, the base station 404 evaluates the CSI feedback or the UL information to determine whether or not to adjust a density or a location of DMRS for at least one PUCCH format. For example, at 408 the base station 404 may determine to adjust the DMRS density of a PUCCH format based on an estimated signal to interference and noise ratio (SINR) and/or CSI feedback and/or quality of uplink reception and/or HARQ history information. Additionally, the base station 404 may change the density and/or location of DMRS for at least one PUCCH format, for example, PUCCH format 2 and/or format 0 and/or format 3.

In one aspect, a determination by the base station 404 to change a DMRS density and/or location may be linked to a change of the length of PUCCH format 2, based on certain specifications and/or configurations by the BS, e.g., via RRC signaling. Additionally, the density and/or location of DMRS of the PUCCH format may be dynamically changed by the base station 404, for example, by selecting among a set of options defined in certain specifications.

At 410, the base station 404 transmits an adjustment indication to the UE. This transmission may be transmitted by downlink control information (DCI) or other UE-specific transmission and/or by group-common DCI (GC-DCI) and/or by downlink medium access control (MAC) control element (CE)(MAC-CE). In the transmission, the base station 404 may explicitly indicate the pattern of DMRS, for example, indicating a pattern among a set of options defined in certain specifications. In some aspects, the change of the DMRS density and/or location may be configured by the base station, e.g., in RRC signaling. The DCI or MAC-CE may then indication the density/location of the DMRS configured via the RRC signaling.

In alternative aspects, the adjustment indication 410 may be a dynamic indication for the UE to switch among a set of reconfigurations for a PUCCH or may be an implicit dynamic indication for the UE to adjust based on another signaling. For example, in one aspect the density and/or location of DMRS for a PUCCH may be adjusted by the dynamic indication and the number of its OFDM symbols increased based on receiving a coverage-enhancement indication. In another aspect the density and/or location of DMRS for a PUCCH may be adjusted and the number of its OFDM symbols may be increased if it contains an ACK in response to a PDSCH that carries a beam-switching MAC-CE.

In one aspect, certain DMRS patterns may be valid when PUCCH is transmitted over a contiguous set of OFDM symbols, which may be particularly helpful if a short PUCCH over a large number of noncontiguous OFDM symbols is utilized.

At 412, after receiving the adjustment indication, the UE 402 configures the density or location of the DMRS for the PUCCH format in accordance with the adjustment indication. At 414, the UE 402 transmits PUCCH information using the adjusted density or location of the DMRS for the PUCCH format.

FIGS. 5A, 5B, 5C and 5D are diagrams illustrating an example adjustment to the density and location of DMRS used in a short PUCCH format. In one aspect, a short PUCCH (e.g., 1-2 OFDM symbols) may have a UCI payload of less than or equal to two bits. For a 1-symbol short PUCCH with a UCI payload of less than or equal to two bits, with or without a scheduling request (SR), sequence selection may use low peak-to-average-power ratio (PAPR). For simultaneous transmission of a two-bit hybrid automatic repeat request (HARQ)-acknowledgement (ACK)(HARQ-ACK) and SRs, a PUCCH format 0 may be used. Computer generated sequences (CGSs) having a length 12 with consecutive mapping within a PRB may be supported. Additionally, the supported number of base sequences may be at least 30. Additionally, the number of cyclic shifts available for one base sequence may be at least 12.

For a 2-symbol short PUCCH with a UCI payload less than or equal to two bits, with or without SR, a 2-symbol PUCCH may be composed of two 1-symbol PUCCHs conveying the same UCI. Sequence hopping between the two symbols may be supported and frequency hopping may also be supported at least for a localized (contiguous) PRB allocation in each symbol. Frequency-hopping for a PUCCH may also occur within the active UL bandwidth part (BWP) for the UE. The active BWP refers to BWP associated with the numerology of PUCCH.

For short a PUCCH (e.g., 1-2 OFDM symbols) having a UCI payload of greater than two bits, RS and UCI may be multiplexed in a frequency division multiplexing (FDM) manner in the orthogonal frequency division multiplexing (OFDM) symbols where RS and UCI are mapped on different subcarriers and coherent demodulation is supported.

In one aspect, encoded UCI bits are scrambled using an LTE PN sequence generator initialized based on the scrambling ID for the PUSCH. In one aspect, modulation of UCI may use quadrature phase shift keying (QPSK).

In one aspect, the number of PRBs used for transmission may be determined by the total number of UCI bits and/or the configured maximum code-rate and/or be upper bounded by the configured number of PRBs. In one aspect, localized (contiguous) allocations may be supported.

In an aspect, the number of PRBs that are used for a PUCCH may be configurable. In addition to RRC configuration, the number of PRBs can be additionally determined as a function of UCI payload size or by dynamic indication via DCI.

Figure 5:
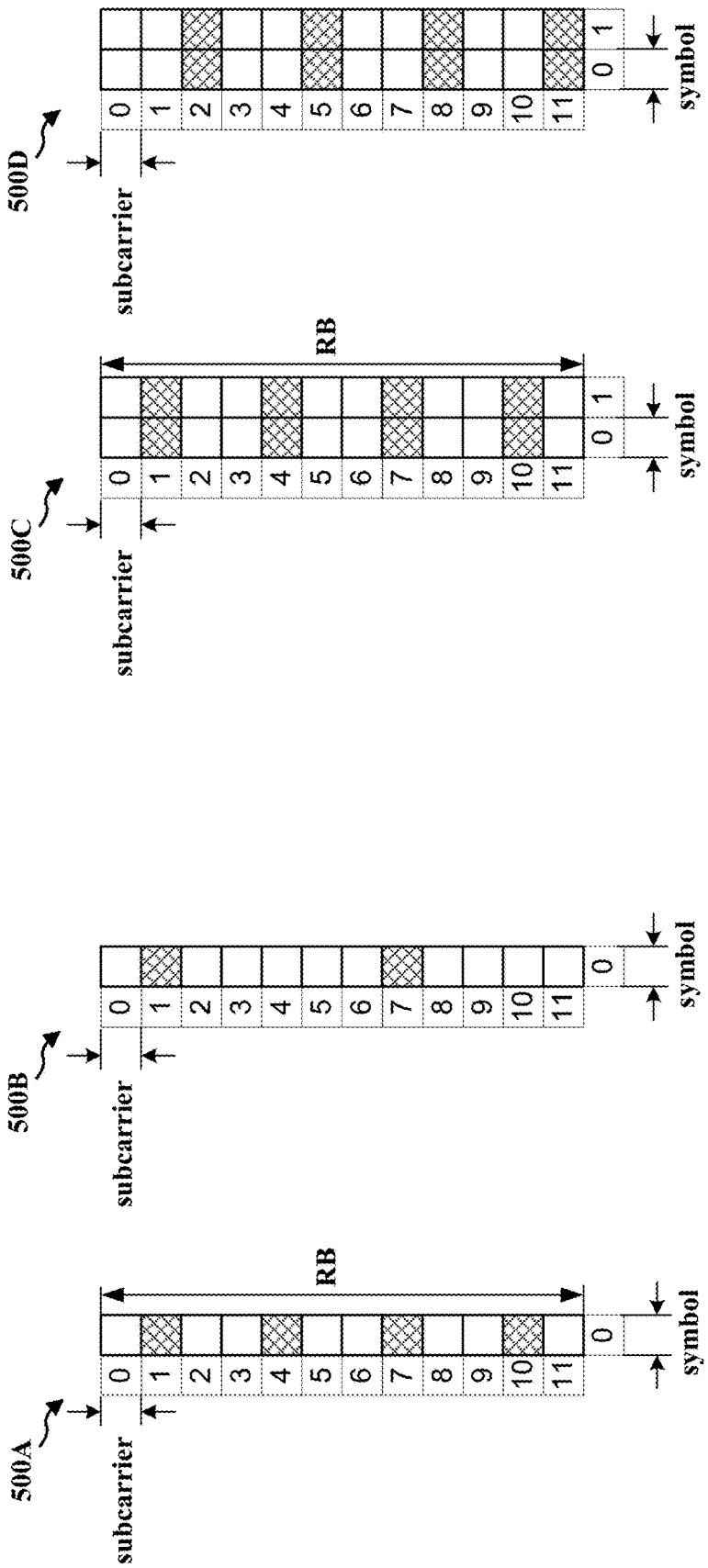
FIG. 5A is a diagram illustrating an example DMRS used in a short PUCCH format having a density, in accordance with various aspects of the present disclosure.
FIG. 5B is a diagram illustrating an example adjustment to the density of DMRS used in the short PUCCH format of FIG. 5A, in accordance with various aspects of the present disclosure.
FIG. 5C is a diagram illustrating an example DMRS used in a short PUCCH format having a particular location, in accordance with various aspects of the present disclosure.
FIG. 5D is a diagram illustrating an example adjustment to the location of DMRS used in the short PUCCH format of FIG. 5C, in accordance with various aspects of the present disclosure.

In an aspect, the number of DMRS resource elements (REs) per PRB may be four, which provides a DMRS overhead of ⅓. In another aspect, DMRS resource elements may be evenly distributed within a PRB in subcarriers #1, #4, #7, #10 for a given resource block (RB), as shown in FIG. 5A. For 2-symbol transmission, the same DMRS density and pattern (e.g., the same DMRS locations) as a 1-symbol short PUCCH with UCI payload greater than 2 bits can be used for each symbol of the 2-symbol PUCCH, as shown in FIG. 5C. The sequences used for DMRS may be the same as for cyclic prefix (CP)-OFDM PUSCH DMRS, and may be obtained with an LTE PN sequence generator.

For 2-symbol short-PUCCH with a UCI payload greater than 2 bits, the encoded UCI bits may be mapped across two symbols. Additionally, frequency hopping may be supported. Frequency-hopping for a PUCCH may occur within the active UL BWP for the UE and the active BWP refers to a BWP associated with the numerology of a PUCCH. Simultaneous transmission of HARQ-ACK bits and CSI feedback with or without SR with PUCCH format 2 may also be supported by RRC configuration.

In one aspect, there may be no additional RRC signaling involved regarding how encoding is done for CSI/HARQ-ACK/SR. In one aspect, whether some UCI is dropped or not may not be considered as part of the encoding.

FIG. 5A is a diagram 500A illustrating an example DMRS used in a short PUCCH format having a density corresponding to four subcarriers, e.g., 1, 4, 7, and 10. FIG. 5B is a diagram 500B illustrating an example adjustment to the density of DMRS used in the short PUCCH format of FIG. 5A. The adjustment reduces the density from four subcarriers to two subcarriers. Alternatively, an adjustment may also increase the density being used.

FIG. 5C is a diagram 500C illustrating an example DMRS used in a short PUCCH format having a location corresponding to four subcarriers, e.g., 1, 4, 7, and 10. FIG. 5D is a diagram 500D illustrating an example adjustment to the location of DMRS used in the short PUCCH format of FIG. 5C. The adjustment changes the location of the subcarriers being used to 2, 5, 8, and 11. Although the illustrated adjustment shifts the subcarriers in one direction, the adjustment may alternatively shift the subcarriers in the other direction.

Figure 6:
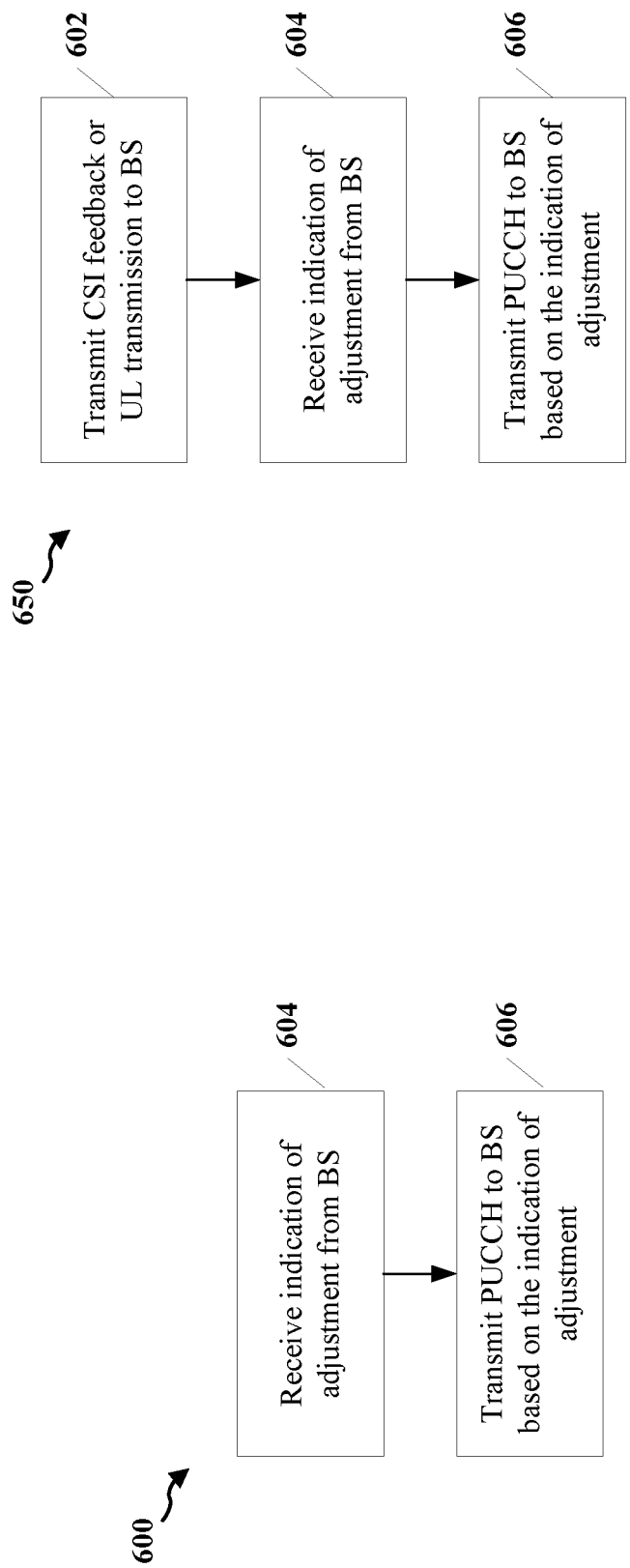
FIGS. 6A and 6B are flowcharts of methods of wireless communication at a UE, in accordance with various aspects of the present disclosure.

FIG. 6A is a flowchart 600 of a method of wireless communication. The method may be performed by a UE (e.g., the UE 104, 350, 402; the apparatus 702). The method may enable the adaptation of PUCCH communication within a slot (e.g., rather than for repetitions over multiple slots). The adaptation may allow for an increased payload over time with a more efficient use of wireless resource. For example, using shorter PUCCH formats may enable faster beam switching and a quicker response to changes in channel conditions.

At 604, the UE receives from the base station an indication of an adjustment to at least one of a density or a location of one or more DMRS for at least one PUCCH format. FIG. 4 illustrates an example of a UE 402 receiving an adjustment indication, at 410, from a base station 404. The UE may make, e.g., apply, an adjustment to the density or the location of DMRS for the at least one PUCCH format in accordance with the indication. In one aspect, 604 may be performed by the indication component 742 and/in FIG. 7.

At 606, the UE transmits to the base station a PUCCH based on the indication of the adjustment to at least one of the density or the location of the one or more DMRS. In one aspect, 606 may be performed by the PUCCH format component 740 and/or the transmission component 734 in FIG. 7. FIG. 4 illustrates an example of a UE 402 transmitting a PUCCH 414 to the base station 404 based on the indication of the adjustment, at 410. FIGS. 5A-5D illustrate various aspects regarding a density or location of a DMRS for PUCCH, which may be adjusted.

FIG. 6B illustrates a flowchart 650 of a method of wireless communication that may include the reception, from the base station, based on at least one of the CSI feedback or the uplink transmission, an indication of an adjustment to at least one of a density or a location of one or more DMRS for at least one PUCCH format, at 604, and the transmission to the base station a PUCCH based on the indication of the adjustment to at least one of the density or the location of the one or more DMRS, at 606, as described in connection with FIG. 6A.

As illustrated at 602 in FIG. 6B, the UE may transmit to the BS at least one of CSI feedback or an uplink transmission. The adjustment of the density or location of the DMRS(s) may be based on the CSI feedback or the uplink transmission from the UE. In one aspect, 602 may be performed by the transmission component 734 in FIG. 7. The transmission of the CSI may be performed, e.g., by the CSI component 744 of the apparatus 702 in FIG. 7. The transmission of the uplink transmission may be performed, e.g., by the uplink component 746 of the apparatus 702.

In one aspect, the adjustment to the density or the location of the DMRS may be based on at least one of an uplink channel measurement, a SINR, or a HARQ process. Such information may be provided to the BS by the UE, for example, in the CSI feedback or UL transmission.

In one aspect, the at least one PUCCH format is a short PUCCH format may include one or more of PUCCH format 2, PUCCH format 0, or PUCCH format 3. In one aspect, the adjustment to the density or the location of the one or more DMRS may correspond to an adjustment to a length of the at least one PUCCH format. In one format the adjustment to the density of the DMRS may correspond to an increase in or a decrease in a number of OFDM symbols per slot. For example, the number of OFDM symbols per slot can be increased or decreased based on at least one of a coverage enhancement indication or an ACK to a PDSCH.

In one aspect, the density or the location of the one or more DMRS may correspond to one or more DMRS patterns. In one aspect, the one or more DMRS patterns may be associated with a contiguous set of OFDM symbols. Additionally, the adjustment to the density or the location of the one or more DMRS may be configured or defined. In some aspects, a change of DMRS density and/or location may be linked to a change of a length of a PUCCH format (e.g., PUCCH format 2) based on a rule or definition. In other aspects, the change may be configured by the base station. For example, the indication may correspond to one of a set of preconfigured or predefined reconfigurations for a PUCCH. In some aspects, the UE may receive a dynamic indication of a change in the density and/or location of the DMRS of a PUCCH. In one aspect, the indication may be received by the UE via one or more of a UE-specific DCI or GC-DCI, or a MAC-CE. In some aspects, the UE may receive the indication of a pattern of DMRS, e.g., from a set of pattern options that may be configured or defined. The UE may receive the indication of a switch among a set of reconfigurations for the PUCCH. Thus, the UE may receive a change in a configuration option for the PUCCH, then may receive an indication for the UE to use the new configuration option. In some aspects, the UE may receive the indication to change based on other signaling. For example, the UE may receive the indication based on an increase in the density and/or location of the DMRS for the PUCCH based on transmission of a coverage enhancement indication. As another example, the UE may switch the density and/or location of DMRS for PUCCH (e.g., PUCCH format 0) if the PUCCH contains an ACK in response to a PDSCH that carries a beam switching MAC-CE for the UE.

Figure 7:
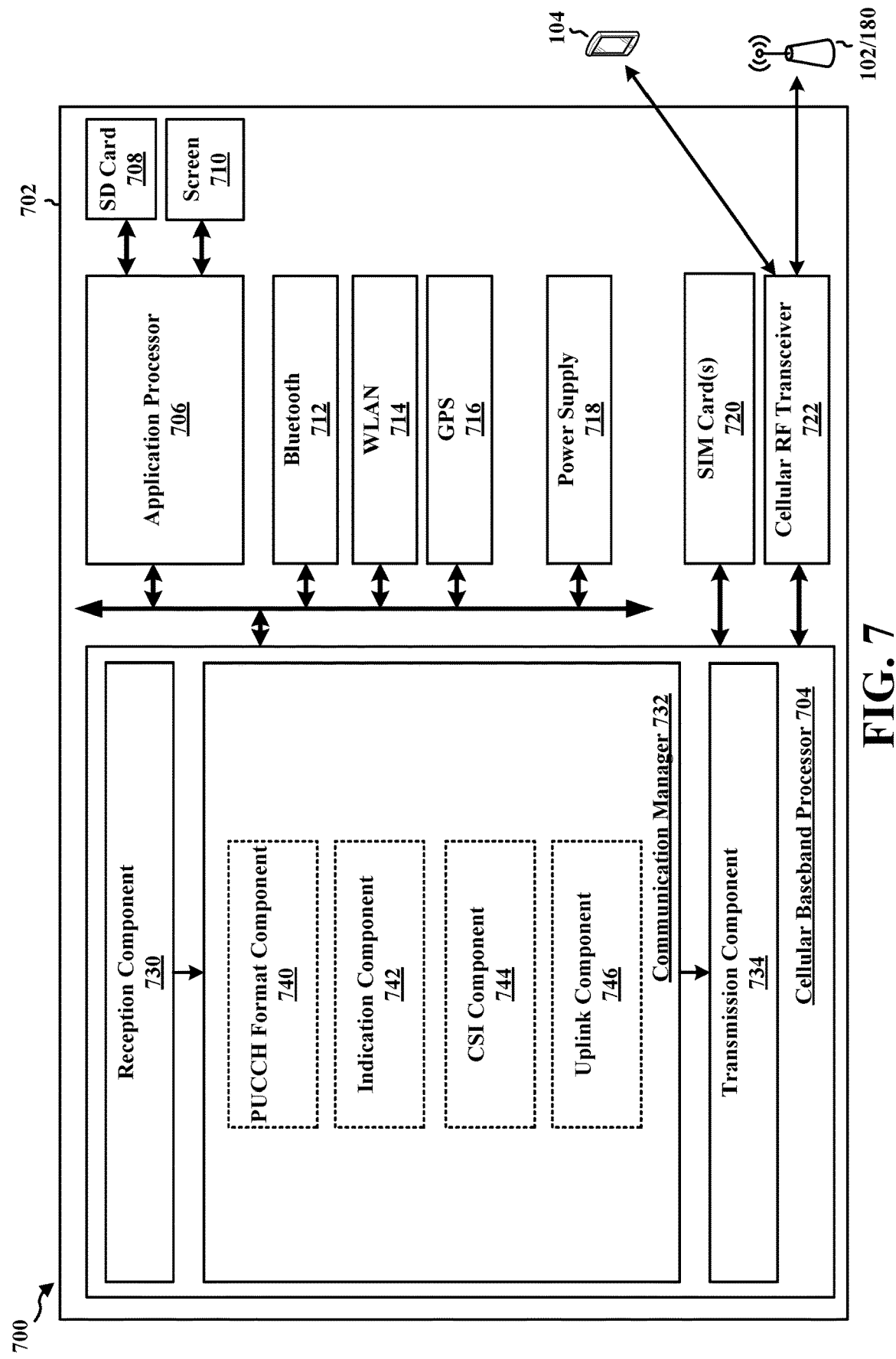
FIG. 7 is a diagram illustrating an example of a hardware implementation for an example UE apparatus, in accordance with various aspects of the present disclosure.

FIG. 7 is a diagram 700 illustrating an example of a hardware implementation for an apparatus 702. The apparatus 702 may be a UE, a component of a UE, or may implement UE functionality. In some aspects, the apparatus 702 may include a cellular baseband processor 704 (also referred to as a modem) coupled to a cellular RF transceiver 722. In some aspects, the apparatus 702 may further include one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the cellular baseband processor 704, and in another configuration, the apparatus 702 may be the entire UE (e.g., see 350 of FIG. 3) and include the additional modules of the apparatus 702.

The communication manager 732 includes an indication component 742 that is configured to receive an indication of an adjustment to the density or the location of DMRS for at least one PUCCH format in accordance with an indication received from the BS, e.g., as described in connection with 604 of FIG. 6A or 6B. The apparatus 702 may include a CSI component 744 is further configured to transmit CSI feedback transmission to the BS, e.g., as described in connection with 602 of FIG. 6B. The apparatus 702 may include an uplink component 746 configured to transmit an uplink transmission to the BS, e.g., as described in connection with 602 in FIG. 6B. The transmission component 734 and the PUCCH format component may be configured to transmit a PUCCH to the BS using the adjusted density or the adjusted location of DMRS for the at least one PUCCH format, e.g., as described in connection with 606 of FIG. 6A or 6B.

The apparatus may include additional components that perform each of the blocks of the algorithm in the flowcharts of FIG. 6A, 6B and/or the aspects performed by the UE in FIG. 4. As such, each block in the flowcharts of FIG. 6A, 6B and/or the aspects performed by the UE in FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 702 may include a variety of components configured for various functions. In one configuration, the apparatus 702, and in particular the cellular baseband processor 704, includes means for transmitting, to a base station, at least one of CSI feedback or an uplink transmission; means for receiving, from the base station based on at least one of the CSI feedback or the uplink transmission, an indication of an adjustment to at least one of a density or a location of one or more DMRS for at least one PUCCH format; and means for transmitting to the base station a PUCCH based on the indication of the adjustment to at least one of the density or the location of the one or more DMRS. The means may be one or more of the components of the apparatus 702 configured to perform the functions recited by the means. As described supra, the apparatus 702 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 8:
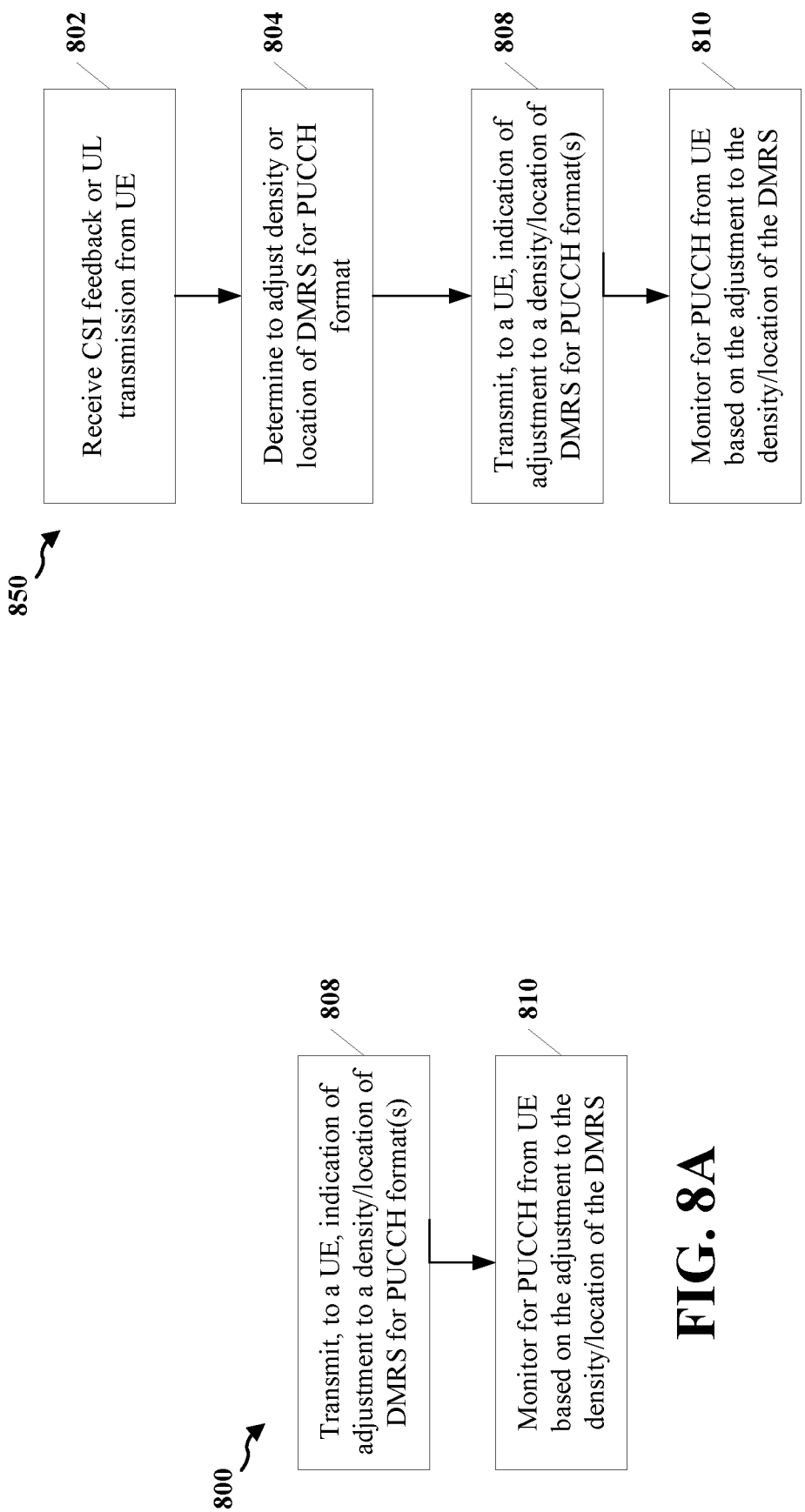
FIGS. 8A and 8B are flowcharts of methods of wireless communication at a base station, in accordance with various aspects of the present disclosure.

FIG. 8A is a flowchart 800 of a method of wireless communication. The method may be performed by a base station (e.g., the base station 102/180, 310, 404; the apparatus 902. The method may enable the adaptation of PUCCH communication within a slot (e.g., rather than for repetitions over multiple slots). The adaptation may allow for an increased payload over time with a more efficient use of wireless resource. For example, using shorter PUCCH formats may enable faster beam switching and a quicker response to changes in channel conditions.

At 808, the base station transmits an indication to the UE of the adjustment to at least one of the density or the location of the one or more DMRS for the at least one PUCCH format. In one aspect, 804 may be performed by the indication component 944 in FIG. 9 in accordance with the transmission component 934 in FIG. 9. For example, the indication may be transmitted via at least one of UE-specific DCI, GC-DCI, or a MAC-CE. FIG. 4 illustrates a base station 404 transmitting an adjustment indication 410 to a UE 402. FIG. 5A-5D illustrate various example aspects of density and location for DMRS.

At 810, the base station monitors for PUCCH based on the adjustment to the density or the location of the DMRS indicated to the UE. For example, the base station may receive a PUCCH from the UE based on the indication of the adjustment to at least one of the density or the location of the one or more DMRS, e.g., as illustrated in FIG. 4. In one aspect, 810 may be performed by the reception component 930, the PUCCH format component 942, and/or the DMRS component 940 in FIG. 9. For example, the received PUCCH form the UE includes the adjusted density and/or the adjusted location indicated in the indication.

FIG. 8B illustrates an example flowchart 850 of a method of wireless communication that may include 808 and 810 of FIG. 8A. As illustrated at 802, the base station may receive at least one of CSI feedback or uplink transmission from a UE. The adjustment to the at least one of the density or the location of the DMRS for the PUCCH format may be based on the CSI feedback of the uplink transmission from the UE. In one aspect, 802 may be performed by the reception component 930, the CSI component 946, and/or the uplink component 948 in FIG. 9.

At 804, the base station may determine to adjust at least one of a density or a location of one or more DMRS for at least one PUCCH format. The determination may include any of the aspects described in connection with 408 in FIG. 4. In one aspect, 804 may be performed by the DMRS component 940 in FIG. 9. For example, the determination to adjust the density and/or the location of the one or more DMRS can be based on at least one of an uplink channel measurement, a SINR, or a HARQ process. Additionally, the determination to adjust the density and/or the location of the one or more DMRS can be based on information received from the UE or other information not received from the UE.

In one aspect, the at least one PUCCH format is a short PUCCH format including PUCCH format 2, PUCCH format 3, or PUCCH format 0.

In one aspect, the adjustment to the density and/or the location of the one or more DMRS corresponds to an adjustment to a length of the at least one PUCCH format.

In one aspect, the adjustment to the density of the one or more DMRS corresponds to an increase or a decrease in a number of OFDM symbols per slot. For example, the number of OFDM symbols per slot may be increased or decreased based on at least one of a coverage enhancement indication or an ACK to a PDSCH.

In one aspect, at least one of the density or the location of the one or more DMRS corresponds to one or more DMRS patterns. For example, the one or more DMRS patterns can be associated with a contiguous set of OFDM symbols.

In one aspect, the adjustment to the density or the location of the one or more DMRS is preconfigured or predefined. For example, the indication may correspond to one of a set of preconfigured or predefined reconfigurations for a PUCCH.

In one aspect, the density or the location of the one or more DMRS may correspond to one or more DMRS patterns. In one aspect, the one or more DMRS patterns may be associated with a contiguous set of OFDM symbols. Additionally, the adjustment to the density or the location of the one or more DMRS may be configured or defined. In some aspects, a change of DMRS density and/or location may be linked to a change of a length of a PUCCH format (e.g., PUCCH format 2) based on a rule or definition. In other aspects, the change may be configured by the base station. For example, the indication may correspond to one of a set of preconfigured or predefined reconfigurations for a PUCCH. In some aspects, the base station may dynamically change the density and/or location of the DMRS of a PUCCH. In one aspect, the indication may be transmitted to the UE via one or more of a UE-specific DCI or GC-DCI, or a MAC-CE. In some aspects, the base station may indicate a pattern of DMRS, e.g., from a set of pattern options that may be configured or defined. The base station may indicate a switch among a set of reconfigurations for the PUCCH. Thus, the base station may change a configuration option for the PUCCH, then may indicate for the UE to use the new configuration option. In some aspects, the base station may indicate the change to the UE based on other signaling. For example, the base station may indicate an increase in the density and/or location of the DMRS for the PUCCH based on transmission of a coverage enhancement indication. As another example, the UE may switch the density and/or location of DMRS for PUCCH (e.g., PUCCH format 0) if the PUCCH contains an ACK in response to a PDSCH that carries a beam switching MAC-CE for the UE.

Figure 9:
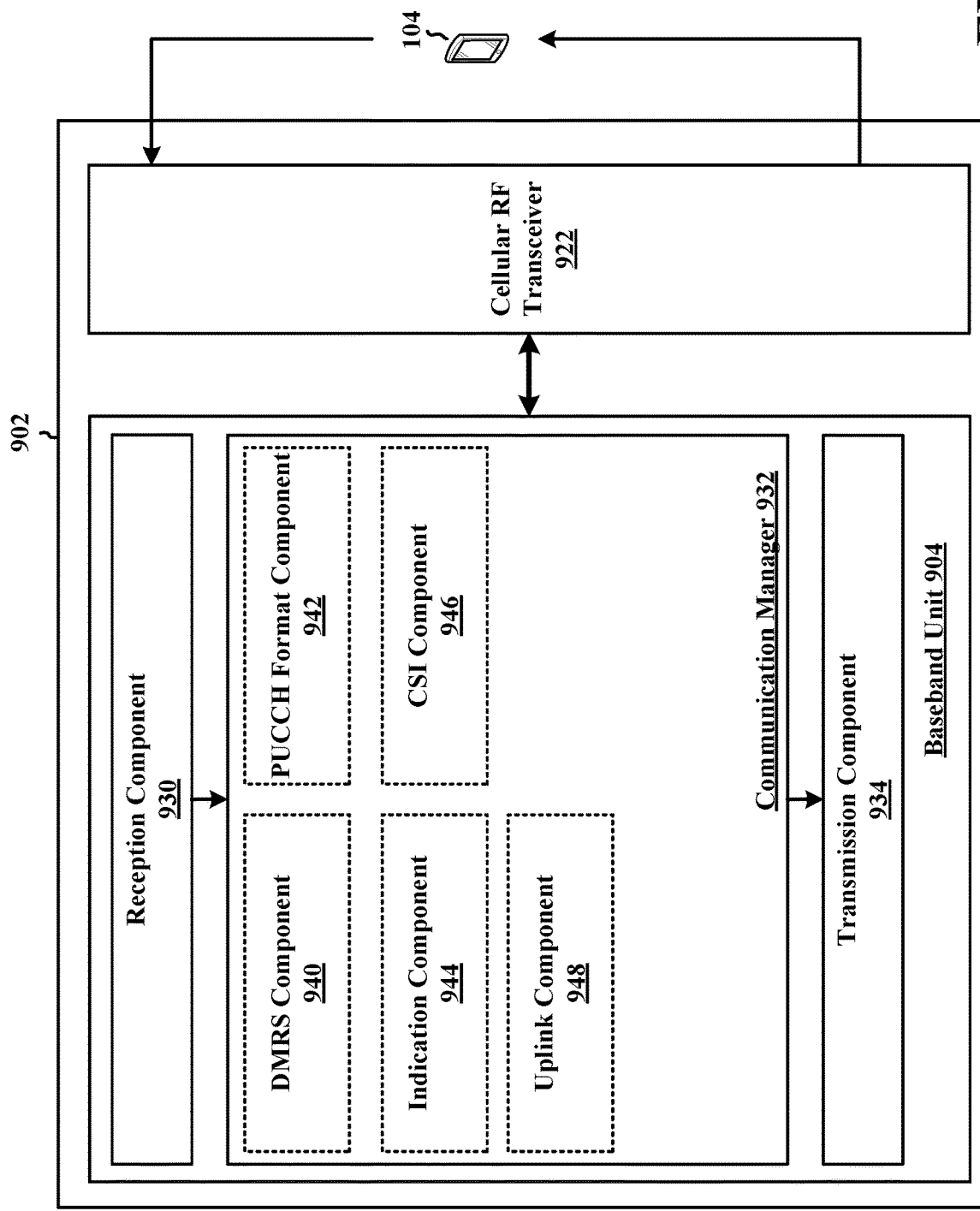
FIG. 9 is a diagram illustrating an example of a hardware implementation for an example BS apparatus, in accordance with various aspects of the present disclosure.

FIG. 9 is a diagram 900 illustrating an example of a hardware implementation for an apparatus 902. The apparatus 902 may be a base station, a component of a base station, or may implement base station functionality. In some aspects, the apparatus 902 includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The apparatus 902 may include a reception component 930, CSI component 946, and/or uplink component 948 configured to receive CSI feedback or a UL transmission from the UE and provide the received information to the DMRS component 940, e.g., as described in connection with 802 in FIG. 8B. The communication manager 932 includes a DMRS component 940 that is configured to determine to adjust the density or the location of DMRS for one or more PUCCH formats, e.g., as described in connection with 804 of FIG. 8B. The communication manager 932 further includes an indication component 944 that is configured to adjust the density or the location of DMRS for one or more PUCCH formats and transmit an indication of the adjustment to the UE, e.g., as described in connection with 808 of FIG. 8A or 8B. The reception component 930 and/or the PUCCH format component 942 may be further configured to monitor for a PUCCH transmission from the UE with adjusted density or adjusted location of DMRS based on the indication transmitted to the UE, e.g., as described in connection with 810 in FIG. 8A or 8B.

The apparatus may include additional components that perform each of the blocks of the algorithm in the flowcharts of FIGS. 8A, 8B, and/or the aspects performed by the base station in FIG. 4. As such, each block in the flowcharts of FIGS. 8A, 8B, and/or the aspects performed by the base station in FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the baseband unit 904, includes means for transmitting, to the UE, an indication of the adjustment to at least one of the density or the location of the one or more DMRS for the at least one PUCCH format and means for monitoring for PUCCH based on the adjustment to the density or the location of the DMRS indicated to the UE. The apparatus may further include means for determining to adjust at least one of a density or a location of one or more DMRS for at least one PUCCH format; means for adjusting at least one of the density or the location of the one or more DMRS for the at least one PUCCH format based on at least one of CSI feedback or an uplink transmission from a UE; and. The means may be one or more of the components of the apparatus 902 configured to perform the functions recited by the means. As described supra, the apparatus 902 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Aspect 1 is a method of wireless communication of a base station. The method includes determining to adjust at least one of a density or a location of one or more DMRS for at least one PUCCH format. The method includes adjusting at least one of the density or the location of the one or more DMRS for the at least one PUCCH format based on at least one of CSI feedback or an uplink transmission from a UE. The method also includes transmitting, to the UE, an indication of the adjustment to at least one of the density or the location of the one or more DMRS for the at least one PUCCH format.

Aspect 2 is the method of aspect 1, where the at least one PUCCH format is a short PUCCH format including PUCCH format 2 or PUCCH format 3.

Aspect 3 is the method of any of aspects 1 and 2, where the adjustment to at least one of the density or the location of the one or more DMRS corresponds to an adjustment to a length of the at least one PUCCH format.

Aspect 4 is the method of any of aspects 1 to 3, where the adjustment to the density of the one or more DMRS corresponds to an increase or a decrease in a number of orthogonal frequency division multiplexing (OFDM) symbols per slot.

Aspect 5 is the method of any of aspects 1 to 4, where the number of OFDM symbols per slot is increased or decreased based on at least one of a coverage enhancement indication or an acknowledgement (ACK) to a physical downlink shared channel (PDSCH).

Aspect 6 is the method of any of aspects 1 to 5, where at least one of the density or the location of the one or more DMRS corresponds to one or more DMRS patterns.

Aspect 7 is the method of any of aspects 1 to 6, where the one or more DMRS patterns are associated with a contiguous set of orthogonal frequency division multiplexing (OFDM) symbols.

Aspect 8 is the method of any of aspects 1 to 7, further comprising receiving, from the UE, at least one of the CSI feedback or the uplink transmission.

Aspect 9 is the method of any of aspects 1 to 8, further comprising receiving, from the UE, a PUCCH based on the indication of the adjustment to at least one of the density or the location of the one or more DMRS.

Aspect 10 is the method of any of aspects 1 to 9, where the adjustment of the at least one of the density or the location of the one or more DMRS is further based on at least one of an uplink channel measurement, a signal-to-interference plus noise ratio (SINR), or a hybrid automatic repeat request (HARD) process.

Aspect 11 is the method of any of aspects 1 to 10, where the indication corresponds to one of a set of reconfigurations for a PUCCH.

Aspect 12 is the method of any of aspects 1 to 11, where the indication is transmitted via at least one of UE-specific downlink control information (DCI), group-common DCI, or a medium access control (MAC) control element (MAC-CE).

Aspect 13 is the method of any of aspects 1 to 12, where the adjustment to at least one of the density or the location of the one or more DMRS is preconfigured or predefined.

Aspect 14 is an apparatus for wireless communication at a base station including means for implementing a method as in any of aspects 1 to 13.

Aspect 15 is an apparatus for wireless communication including at least one processor coupled to a memory and configured to implement a method as in any of aspects 1 to 13.

Aspect 16 is a computer-readable medium storing computer executable code, where the code when executed by a processor causes the processor to implement a method as in any of aspects 1 to 13.

Aspect 17 is a method of wireless communication of a user equipment. The method includes transmitting, to a base station, at least one of channel state information (CSI) feedback or an uplink transmission. The method includes receiving, from the base station based on at least one of the CSI feedback or the uplink transmission, an indication of an adjustment to at least one of a density or a location of one or more demodulation reference signals (DMRS) for at least one physical uplink control channel (PUCCH) format. The method also includes transmitting to the base station a PUCCH based on the indication of the adjustment to at least one of the density or the location of the one or more DMRS.

Aspect 18 is the method of aspect 17, where the at least one PUCCH format is a short PUCCH format including PUCCH format 2 or PUCCH format 3.

Aspect 19 is the method of any of aspects 17 to 18, where the adjustment to at least one of the density or the location of the one or more DMRS corresponds to an adjustment to a length of the at least one PUCCH format.

Aspect 20 is the method of any of aspects 17 to 19, where the adjustment to the density of the one or more DMRS corresponds to an increase or a decrease in a number of orthogonal frequency division multiplexing (OFDM) symbols per slot.

Aspect 21 is the method of any of aspects 17 to 20, where the number of OFDM symbols per slot is increased or decreased based on at least one of a coverage enhancement indication or an acknowledgement (ACK) to a physical downlink shared channel (PDSCH).

Aspect 22 is the method of any of aspects 17 to 21, where at least one of the density or the location of the one or more DMRS corresponds to one or more DMRS patterns.

Aspect 23 is the method of any of aspects 17 to 22, where the one or more DMRS patterns are associated with a contiguous set of orthogonal frequency division multiplexing (OFDM) symbols.

Aspect 24 is the method of any of aspects 17 to 23, where the adjustment to at least one of the density or the location of the one or more DMRS is based on at least one of an uplink channel measurement, a signal-to-interference plus noise ratio (SINR), or a hybrid automatic repeat request (HARD) process.

Aspect 25 is the method of any of aspects 17 to 24, where the indication corresponds to one of a set of reconfigurations for a PUCCH.

Aspect 26 is the method of any of aspects 17 to 25, where the indication is received via at least one of UE-specific downlink control information (DCI), group-common DCI, or a medium access control (MAC) control element (MAC-CE).

Aspect 27 is the method of any of aspects 17 to 26, where the adjustment to at least one of the density or the location of the one or more DMRS is preconfigured or predefined.

Aspect 28 is an apparatus for wireless communication including means for implementing a method as in any of aspects 17 to 27.

Aspect 29 is an apparatus for wireless communication including at least one processor coupled to a memory and configured to implement a method as in any of aspects 17 to 27.

Aspect 30 is a computer-readable medium storing computer executable code, where the code when executed by a processor causes the processor to implement a method as in any of aspects 17 to 27.

Aspect 31 is a method of wireless communication of a base station, comprising: transmitting, to a UE, an indication of an adjustment to at least one of a density or a location of one or more DMRS for at least one PUCCH format; and monitoring for PUCCH based on the adjustment to the density or the location of the DMRS indicated to the UE.

In aspect 32, the method of aspect 31 further includes receiving at least one of CSI feedback or an uplink transmission from the UE, the adjustment to the at least one of the density or the location of the DMRS for the at least one PUCCH format being based on the CSI feedback of the uplink transmission from the UE.

In aspect 33, the method of aspect 31 or aspect 32 further includes that the at least one PUCCH format is a short PUCCH format including PUCCH format 2 or PUCCH format 3.

In aspect 34, the method of any of aspects 31-33 further includes that the adjustment to at least one of the density or the location of the one or more DMRS corresponds to a length adjustment of the at least one PUCCH format.

In aspect 35, the method of any of aspects 31-34 further includes that the adjustment to the density of the one or more DMRS corresponds to an increase or a decrease in a number of OFDM symbols per slot.

In aspect 36, the method of aspect 35 further includes that the number of OFDM symbols per slot is increased or decreased based on at least one of a coverage enhancement indication or an ACK to a PDSCH.

In aspect 37, the method of any of aspects 31-36 further includes that at least one of the density or the location of the one or more DMRS corresponds to one or more DMRS patterns.

In aspect 38, the method of aspect 37 further includes that the one or more DMRS patterns are associated with a contiguous set of OFDM symbols.

In aspect 39, the method of any of aspects 31-38 further includes receiving, from the UE, the PUCCH based on the indication of the adjustment to at least one of the density or the location of the one or more DMRS.

In aspect 40, the method of any of aspects 31-39 further includes that the adjustment of the at least one of the density or the location of the one or more DMRS is further based on at least one of an uplink channel measurement, a SINR, or a HARQ process.

In aspect 41, the method of any of aspects 31-40 further includes that the indication corresponds to one of a set of reconfigurations for the at least one PUCCH format.

In aspect 42, the method of any of aspects 31-41 further includes that the indication is transmitted via at least one of UE-specific DCI, group-common DCI, or a MAC-CE.

In aspect 43, the method of any of aspects 31-42 further includes that the adjustment to at least one of the density or the location of the one or more DMRS is preconfigured or predefined.

Aspect 44 is an apparatus for wireless communication including at least one processor coupled to a memory, the memory and the at least one processor configured to perform the method of any of aspects 31-43.

In aspect 45, the apparatus of aspect 44 further includes at least one of an antenna or a transceiver coupled to the at least one processor.

Aspect 46 is an apparatus for wireless communication including means for performing the method of any of aspects 31-43.

In aspect 47, the apparatus of aspect 46 further includes at least one of an antenna or a transceiver.

Aspect 48 is a non-transitory computer-readable medium storing computer executable code, where the code when executed by a processor causes the processor to implement any of aspects 31-43.

Aspect 49 is a method of wireless communication of a UE, comprising: receiving, from a base station, an indication of an adjustment to at least one of a density or a location of one or more DMRS for at least one PUCCH format; and transmitting to the base station a PUCCH based on the indication of the adjustment to at least one of the density or the location of the one or more DMRS.

In aspect 50, the method of aspect 49 further includes transmitting, to a base station, at least one of CSI feedback or an uplink transmission, the adjustment to the at least one of the density or the location of the one or more DMRS for the at least one PUCCH format being based on the CSI feedback or the uplink transmission.

In aspect 51, the method of aspect 49 or aspect 50 further includes that the at least one PUCCH format is a short PUCCH format including PUCCH format 2 or PUCCH format 3.

In aspect 52, the method of any of aspects 49-51 further includes that the adjustment to at least one of the density or the location of the one or more DMRS corresponds to a length adjustment of the at least one PUCCH format.

In aspect 53, the method of any of aspects 49-52 further includes that the adjustment to the density of the one or more DMRS corresponds to an increase or a decrease in a number of OFDM symbols per slot.

In aspect 54, the method of aspect 53 further includes that the number of OFDM symbols per slot is increased or decreased based on at least one of a coverage enhancement indication or an ACK to a PDSCH.

In aspect 55, the method of any of aspects 49-54 further includes that at least one of the density or the location of the one or more DMRS corresponds to one or more DMRS patterns.

In aspect 56, the method of aspect 55 further includes that the one or more DMRS patterns are associated with a contiguous set of OFDM symbols.

In aspect 57, the method of any of aspects 49-56 further includes that the adjustment to at least one of the density or the location of the one or more DMRS is based on at least one of an uplink channel measurement, a SINR, or a HARQ process.

In aspect 58, the method of any of aspects 49-57 further includes that the indication corresponds to one of a set of reconfigurations for the at least one PUCCH format.

In aspect 59, the method of any of aspects 49-58 further includes that the indication is received via at least one of UE-specific DCI, group-common DCI, or a MAC-CE.

In aspect 60, the method of any of aspects 49-59 further includes that the adjustment to at least one of the density or the location of the one or more DMRS is preconfigured or predefined.

Aspect 61 is an apparatus for wireless communication including at least one processor coupled to a memory, the memory and the at least one processor configured to perform the method of any of aspects 49-60.

In aspect 62, the apparatus of aspect 61 further includes at least one of an antenna or a transceiver coupled to the at least one processor.

Aspect 63 is an apparatus for wireless communication including means for performing the method of any of aspects 49-60.

In aspect 64, the apparatus of aspect 63 further includes at least one of an antenna or a transceiver.

Aspect 65 is a non-transitory computer-readable medium storing computer executable code, where the code when executed by a processor causes the processor to implement any of aspects 49-60.

What is claimed is:

1. An apparatus for wireless communication of a base station, comprising:
    memory; and
    at least one processor coupled to the memory and configured to:
        transmit, to a user equipment (UE), an indication of an adjustment to at least one of a density or a location of one or more demodulation reference signals (DMRS) in subcarriers for at least one physical uplink control channel (PUCCH) format; and
        monitor for PUCCH based on the adjustment to the density or the location of the DMRS indicated to the UE.

2. The apparatus of claim 1, wherein the at least one processor is further configured to:
    receive at least one of channel state information (CSI) feedback or an uplink transmission from the UE, the adjustment to the at least one of the density or the location of the DMRS for the at least one PUCCH format being based on the CSI feedback of the uplink transmission from the UE.

3. The apparatus of claim 1, wherein the at least one PUCCH format is a short PUCCH format including PUCCH format 2 or PUCCH format 0 having a length of two or fewer symbols, and wherein the one or more DMRS is included in each symbol.

4. The apparatus of claim 1, wherein the adjustment to at least one of the density or the location of the one or more DMRS corresponds to a length adjustment of the at least one PUCCH format.

5. The apparatus of claim 1, wherein the adjustment to the density of the one or more DMRS corresponds to an increase or a decrease in a number of subcarriers per symbol.

6. The apparatus of claim 5, wherein the number is increased or decreased based on at least one of a coverage enhancement indication or an acknowledgement (ACK) to a physical downlink shared channel (PDSCH).

7. The apparatus of claim 1, wherein at least one of the density or the location of the one or more DMRS corresponds to one or more DMRS patterns.

8. The apparatus of claim 7, wherein the one or more DMRS patterns are associated with a contiguous set of orthogonal frequency division multiplexing (OFDM) symbols.

9. The apparatus of claim 1, wherein the at least one processor is further configured to:
    receive, from the UE, the PUCCH based on the indication of the adjustment to at least one of the density or the location of the one or more DMRS.

10. The apparatus of claim 1, wherein the adjustment of the at least one of the density or the location of the one or more DMRS is further based on at least one of an uplink channel measurement, a signal-to-interference plus noise ratio (SINR), or a hybrid automatic repeat request (HARQ) process.

11. The apparatus of claim 1, wherein the indication corresponds to one of a set of reconfigurations for the at least one PUCCH format.

12. The apparatus of claim 1, wherein the indication is transmitted via at least one of UE-specific downlink control information (DCI), group-common DCI, or a medium access control (MAC) control element (MAC-CE).

13. The apparatus of claim 1, wherein the adjustment to at least one of the density or the location of the one or more DMRS is indicated based on a preconfigured adjustment or a predefined adjustment.

14. The apparatus of claim 1, further comprising:
    at least one of an antenna or a transceiver coupled to the at least one processor.

15. A method of wireless communication of a base station, comprising:
    transmitting, to a user equipment (UE), an indication of an adjustment to at least one of a density or a location of one or more demodulation reference signals (DMRS) in subcarriers for at least one physical uplink control channel (PUCCH) format; and
    monitoring for PUCCH based on the adjustment to the density or the location of the DMRS indicated to the UE.

16. An apparatus of wireless communication of a user equipment (UE), comprising:
    memory; and
    at least one processor coupled to the memory and configured to:
        receive, from a base station, an indication of an adjustment to at least one of a density or a location of one or more demodulation reference signals (DMRS) in subcarriers for at least one physical uplink control channel (PUCCH) format; and
        transmit, to the base station, a PUCCH based on the indication of the adjustment to at least one of the density or the location of the one or more DMRS.

17. The apparatus of claim 16, wherein the at least one processor is further configured to:
    transmit, to the base station, at least one of channel state information (CSI) feedback or an uplink transmission, the adjustment to the at least one of the density or the location of the one or more DMRS for the at least one PUCCH format being based on the CSI feedback or the uplink transmission.

18. The apparatus of claim 16, wherein the at least one PUCCH format is a short PUCCH format including PUCCH format 2 or PUCCH format 0 having a length of two or fewer symbols, and wherein the one or more DMRS is included in each symbol.

19. The apparatus of claim 16, wherein the adjustment to at least one of the density or the location of the one or more DMRS corresponds to a length adjustment of the at least one PUCCH format.

20. The apparatus of claim 16, wherein the adjustment to the density of the one or more DMRS corresponds to an increase or a decrease in a number of subcarriers per symbol.

21. The apparatus of claim 20, wherein the number is increased or decreased based on at least one of a coverage enhancement indication or an acknowledgement (ACK) to a physical downlink shared channel (PDSCH).

22. The apparatus of claim 16, wherein at least one of the density or the location of the one or more DMRS corresponds to one or more DMRS patterns.

23. The apparatus of claim 22, wherein the one or more DMRS patterns are associated with a contiguous set of orthogonal frequency division multiplexing (OFDM) symbols.

24. The apparatus of claim 16, wherein the adjustment to at least one of the density or the location of the one or more DMRS is based on at least one of an uplink channel measurement, a signal-to-interference plus noise ratio (SINR), or a hybrid automatic repeat request (HARQ) process.

25. The apparatus of claim 16, wherein the indication corresponds to one of a set of reconfigurations for the at least one PUCCH format.

26. The apparatus of claim 16, wherein the indication is received via at least one of UE-specific downlink control information (DCI), group-common DCI, or a medium access control (MAC) control element (MAC-CE).

27. The apparatus of claim 16, wherein the adjustment to at least one of the density or the location of the one or more DMRS is indicated based on a preconfigured adjustment or a predefined adjustment.

28. The apparatus of claim 16, further comprising:
at least one of an antenna or a transceiver coupled to the at least one processor.

29. A method of wireless communication of a user equipment (UE), comprising:
receiving, from a base station, an indication of an adjustment to at least one of a density or a location of one or more demodulation reference signals (DMRS) in subcarriers for at least one physical uplink control channel (PUCCH) format; and
transmitting to the base station a PUCCH based on the indication of the adjustment to at least one of the density or the location of the one or more DMRS.

* * * * *